United States Patent
Nishiumi et al.

(10) Patent No.: US 11,825,859 B2
(45) Date of Patent: Nov. 28, 2023

(54) LIQUID COFFEE EXTRACT AND DRINK CONTAINING SAME

(71) Applicant: SUNTORY HOLDINGS LIMITED, Osaka (JP)

(72) Inventors: Toshihiro Nishiumi, Kanagawa (JP); Nao Kamezawa, Kanagawa (JP); Atsushi Mukai, Kanagawa (JP); Takashi Mukai, Kyoto (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 245 days.

(21) Appl. No.: 17/414,454

(22) PCT Filed: Dec. 25, 2019

(86) PCT No.: PCT/JP2019/051005
§ 371 (c)(1),
(2) Date: Jun. 16, 2021

(87) PCT Pub. No.: WO2020/138232
PCT Pub. Date: Jul. 2, 2020

(65) Prior Publication Data
US 2021/0337822 A1 Nov. 4, 2021

(30) Foreign Application Priority Data
Dec. 28, 2018 (JP) .................. 2018-247045

(51) Int. Cl.
A23F 5/24 (2006.01)
(52) U.S. Cl.
CPC .................... A23F 5/24 (2013.01)

(58) Field of Classification Search
CPC .......................................... A23F 5/24
See application file for complete search history.

(56) References Cited

U.S. PATENT DOCUMENTS

| 4,129,665 A | 12/1978 | Clark |
| 5,204,136 A | 4/1993 | Hellemons |
| 2016/0242430 A1* | 8/2016 | Daenzer-Alloncle ..... A23F 5/26 |
| 2017/0367366 A1* | 12/2017 | Pouzot ....................... A23F 5/04 |

FOREIGN PATENT DOCUMENTS

| JP | 47-20370 A | 9/1972 |
| JP | 52-125670 A | 10/1977 |
| JP | 2-119748 A | 5/1990 |
| JP | 2009-519004 A | 5/2009 |
| JP | 2009-296951 A | 12/2009 |
| WO | 2007/043873 A1 | 4/2007 |

OTHER PUBLICATIONS

English translation for JP2009296951 published Dec. 2009.*
International Search Report dated Mar. 17, 2020, issued in counterpart International Application No. PCT/JP2019/051005 (2 pages).

* cited by examiner

*Primary Examiner* — Anthony J Weier
(74) *Attorney, Agent, or Firm* — WHDA, LLP

(57) ABSTRACT

A coffee extract with increased coffee-specific aroma and reduced off-flavors is provided. The ratio of (A) the peak area ratio of 2,3-butanedione to (B) the sum of the peak area ratio of guaiacol and the peak area ratio of 4-ethylguaiacol [(A)/(B)] in the coffee extract is adjusted to a specific range. Alternatively, the ratio of (a) the concentration (ppb) of 2,3-butanedione to (b) the total concentration (ppb) of guaiacol and 4-ethylguaiacol [(a)/(b)] in the coffee extract is adjusted to a specific range.

4 Claims, No Drawings

LIQUID COFFEE EXTRACT AND DRINK CONTAINING SAME

TECHNICAL FIELD

The present invention relates to a coffee extract and the like. More specifically, the present invention relates to a coffee extract and the like with increased coffee-specific aroma and reduced off-flavors.

BACKGROUND ART

There is a desire to obtain a coffee extract from a generally available raw material of coffee, from which one can feel a coffee-specific aroma and in which off-flavors are reduced. Development of such a coffee extract is highly commercially advantageous in that a high quality coffee extract can be provided at low cost in a stable manner.

Patent Literature 1 discloses a method for producing a concentrated coffee extract in which a hot aqueous medium is passed through a pair of percolator columns and an extraction step is combined with an evaporative concentration step. Furthermore, Patent Literature 2 discloses a method for producing a concentrated coffee extract by passing hot water through a pair of extraction columns. However, the problem is that since usual raw materials of coffee contain a large amount of off-flavor components, not only good coffee-specific aroma but also the off-flavor components are extracted when coffee is extracted from the materials by a usual extraction method.

CITATION LIST

Patent Literature

PTL 1: Japanese Patent Application Laid-Open No. 47-20370
PTL 2: Japanese Patent Application Laid-Open No. 52-125670

SUMMARY OF INVENTION

Technical Problem

An object of the present invention is to provide a coffee extract with increased coffee-specific aroma and reduced off-flavors, and the like.

Solution to Problem

The present inventors have conducted intensive studies to solve the above problem and have found, for example, that, for a coffee extract comprising 2,3-butanedione, guaiacol and 4-ethylguaiacol, by adjusting the ratio of (A) the peak area ratio of 2,3-butanedione to (B) the sum of the peak area ratio of guaiacol and the peak area ratio of 4-ethylguaiacol [(A)/(B)] to 7.0 or more in a solution prepared by adjusting the coffee solid concentration (Brix) of the coffee extract to 1%, a coffee extract with increased coffee-specific aroma and reduced off-flavors can be provided. The present inventors have also found, for example, that a coffee extract with increased coffee-specific aroma and reduced off-flavors can be provided by adjusting the ratio of (a) the concentration (ppb) of 2,3-butanedione to (b) the total concentration (ppb) of guaiacol and 4-ethylguaiacol [(a)/(b)] to 3.1 or more in a coffee extract comprising 23-butanedione, guaiacol and 4-ethylguaiacol, and have completed the present invention.

That is, the present invention relates to the following, but is not limited thereto.

(1) A coffee extract comprising 2,3-butanedione, guaiacol and 4-ethylguaiacol, wherein the ratio of (A) the peak area ratio of 2,3-butanedione to (B) the sum of the peak area ratio of guaiacol and the peak area ratio of 4-ethylguaiacol [(A)/(B)] is 7.0 or more in a solution prepared by adjusting the coffee solid concentration (Brix) of the coffee extract to 1%, and the peak area ratio is a ratio of the peak area of the respective components to the peak area of borneol when the peak area is measured by using 10 ppb of borneol as an internal standard material by a gas chromatography-mass spectrometry.
(2) The coffee extract according to (1), wherein the [(A)/(B)] is 8.0 to 30.0.
(3) The coffee extract according to (1) or (2), wherein the coffee extract has a coffee solid concentration (Brix) of 20 to 40%.
(4) A drink comprising the coffee extract according to any one of (1) to (3).
(5) A coffee extract comprising 2,3-butanedione, guaiacol and 4-ethylguaiacol, wherein the ratio of (a) the concentration (ppb) of 2,3-butanedione to (b) the total concentration (ppb) of guaiacol and 4-ethylguaiacol [(a)/(b)] in the coffee extract is 3.1 or more.
(6) The coffee extract according to (5), wherein the [(a)/(b)] is 3.4 to 30.0.
(7) The coffee extract according to (5) or (6), wherein the coffee extract has a coffee solid concentration (Brix) of 20 to 40%.
(8) A drink comprising the coffee extract according to any one of (5) to (7).

Advantageous Effects of Invention

The present invention can provide a coffee extract with increased coffee-specific aroma and reduced off-flavors.

DESCRIPTION OF EMBODIMENTS

1. Coffee Extract

An embodiment of the present invention is a coffee extract comprising 2,3-butanedione, guaiacol and 4-ethylguaiacol, wherein the ratio of (A) the peak area ratio of 2,3-butanedione to (B) the sum of the peak area ratio of guaiacol and the peak area ratio of 4-ethylguaiacol [(A)/(B)] is 7.0 or more in a solution prepared by adjusting the coffee solid concentration (Brix) of the coffee extract to 1%. Furthermore, an embodiment of the present invention is a coffee extract comprising 2,3-butanedione, guaiacol and 4-ethylguaiacol, wherein the ratio of (a) the concentration (ppb) of 2,3-butanedione to (b) the total concentration (ppb) of guaiacol and 4-ethylguaiacol [(a)/(b)] in the coffee extract is 3.1 or more. Such configurations can provide a concentrated coffee extract with increased coffee-specific aroma and reduced off-flavors. In the present description, the "coffee-specific aroma" and the "aroma initially felt" mean sweet smell of freshly ground coffee. Furthermore, in the present description, being "remarkably clean" means that coffee extract has no off-flavors.

In the present description, the "coffee extract" means liquid extracted from coffee beans. Examples of coffee extracts includes an extract prepared by extraction of ground coffee beans with a solvent such as water, those prepared by diluting or concentrating the extract, and slurry containing coffee beans or ground coffee beans. Thus, in an embodiment, the coffee extract of the present invention is a concentrated coffee extract. In the present description, the "concentrated coffee extract" means those having higher coffee solid concentration than usual coffee extract.

In the present description, "coffee beans" refer to anyone of raw coffee beans, roasted coffee beans and roasted and ground coffee beans. In the present description, "raw coffee beans" mean coffee beans before the step of roasting in which coffee beans are heated and roasted, "roasted coffee beans" mean coffee beans after the step of roasting, and "roasted and ground coffee beans" mean those prepared by grinding coffee beans after the step of roasting.

In the present invention, the production area and the variety of coffee beans are not particularly limited. Examples of production areas of coffee beans include Brazil, Columbia, Tanzania, Mocha, Kilimanjaro, Mandheling and Blue Mountain. Examples of varieties of coffee beans include *Arabica, Robusta* and *Liberica*. Coffee beans from one production area or coffee beans of one variety may be used, or those from different production areas or of different varieties may be used in combination. Although the variety of coffee beans used for producing the coffee extract of the present invention is not particularly limited, it is preferable to use *Arabica* and *Robusta* coffee beans.

In the present invention, the method of roasting and conditions of roasting for preparing roasted coffee beans from raw coffee beans are not particularly limited. For example, in a method such as a direct heat method, a hot air method, a semi-hot air method, a char-grill method, a far-infrared method, a microwave method or a superheated steam method, an apparatus such as a horizontal (lateral) drum type, a vertical (longitudinal) drum type, a vertically rotating ball type, a fluidized bed type and a pressurization type may be used. Coffee beans may be finished at a degree of roast (light, cinnamon, medium, high, city, full-city, French, Italian) suited to the predetermined purpose depending on the type of beans.

For the roasted and ground coffee beans used in the present invention, the roasting temperature for preparing roasted coffee beans is not particularly limited. The roasting temperature is preferably 100 to 300° C. more preferably 150 to 250° C., particularly preferably 170 to 220° C. The roasting time for preparing roasted coffee beans is also not particularly limited, and is preferably 5 to 30 minutes, more preferably 10 to 25 minutes, and particularly preferably 15 to 20 minutes. The degree of roast for the roasted coffee beans is not particularly limited, and coffee beans are roasted so that the degree of roast is preferably 10 to 30, more preferably 10 to 25, and particularly preferably 15 to 25 in the L value measured by a color difference meter as an index. For the measurement of the degree of roast, ground beans are introduced into a cell and thoroughly tapped to measure the degree of roast by a spectro color meter. SE-2000 made by Nippon Denshoku Industries, Co., Ltd. and the like may be used as a spectro color meter.

The method of grinding for obtaining roasted and ground coffee beans used in the present invention is not particularly limited, and a usual method such as dry grinding or wet drying may be used.

1-1. 2,3-butanedione

The coffee extract of the present invention contains 2,3-butanedione, which is a component that contributes to coffee-specific aroma. The peak area ratio of 2,3-butanedione in a solution prepared by adjusting the coffee solid concentration (Brix) of the coffee extract of the present invention to 1% is not particularly limited as long as the ratio of (A) the peak area ratio of 2,3-butanedione to (B) the sum of the peak area ratio of guaiacol and the peak area ratio of 4-ethylguaiacol [(A)/(B)] is in the predetermined range, and the peak area ratio is preferably 0.3 to 3.0, more preferably 0.5 to 2.0, and further preferably 0.8 to 1.2. When the peak area ratio of 2,3-butanedione (A) in the coffee extract of the present invention is too small, coffee-specific aroma is insufficient, and when the peak area ratio of 2,3-butanedione (A) is too large, the total balance of coffee aroma is lost and unusual sweetness different from that of coffee may be felt.

In the present description, the "peak area ratio" means the ratio of the peak area of the target component to the peak area of borneol (10 ppb) when the peak area is measured by using 10 ppb of borneol as an internal standard material by a gas chromatography-mass spectrometry. Quantitative analysis methods include a calibration curve method using a standard substance for the target component and an internal standard method using an internal standard solution which is not contained in the sample. In both methods calculation is performed based on values of the peak area obtained when gas chromatography-mass spectrometry is performed, and thus the values calculated in both methods are considered to be corelated. Conditions of gas chromatography-mass spectrometry are as follows.

GC main apparatus: Agilent Technologies 7890A
MS detector: Agilent Technologies 5975C inert XL MSD with Triple-Axis Detector
Apparatus for pretreatment: MultiPurpose Sampler MPS for GC
Conditions for injecting sample: DHS (dynamic head space) method
Temperature of sample 80° C.
Pressure 160 kPa
Septum purge flow rate 3 mL/min
Splitless mode
Column: HP-INNOWAX (length: 60 m, diameter: 0.250 mm, thickness: 0.25 μm)
Flow rate 1.5 mL/min
Pressure 160 kPa
Oven: 40° C.→240° C. (7.5° C./min)
Post run: 10 minutes In the above analysis, salt may be added to the sample as necessary to facilitate evaporation of aromatic components into the head space.

Furthermore, the concentration of 2,3-butanedione (ppb) per 1% Brix in the coffee extract of the present invention is not particularly limited as long as the ratio of (a) the concentration (ppb) of 2,3-butanedione to (b) the total concentration (ppb) of guaiacol and 4-ethylguaiacol [(a)/(b)] described later is in the predetermined range. The concentration of 2,3-butanedione (ppb) is preferably $5.0 \times 10^{-3}$ to $1.0 \times 10^5$ ppb, more preferably $1.0 \times 10^{-2}$ to $8.0 \times 10^4$ ppb, and further preferably $1.5 \times 10^{-2}$ to $5.0 \times 10^4$ ppb. When (a) the concentration of 2,3-butanedione in the coffee extract of the present invention is too low, the coffee extract has insufficient coffee-specific aroma, and when (a) the concentration of 2,3-butanedione in the coffee extract of the present invention is too high, the total balance of coffee aroma is lost and unusual sweetness different from that of coffee may be felt.

1-2. Guaiacol and 4-ethylguaiacol

The coffee extract of the present invention contains guaiacol and 4-ethylguaiacol, which are components that contribute to off-flavors peculiar to coffee. The sum of the peak area ratio of guaiacol and the peak area ratio of 4-ethylguaiacol in a solution prepared by adjusting the coffee solid concentration (Brix) of the coffee extract of the present invention to 1% is not particularly limited as long as the [(A)/(B)] described later is in the pre-determined range. The sum is preferably 0.1 to 1.5, more preferably 0.1 to 0.5, and further preferably 0.1 to 0.35. When (B) the sum of the peak area ratio of guaiacol and the peak area ratio of 4-ethylguaiacol in the coffee extract of the present invention is too small, what is called "coffee flavor," which comes from bitterness and off-flavors, is reduced. When (B) the sum of the peak area ratio of guaiacol and the peak area ratio of 4-ethylguaiacol is too high, the off-flavor peculiar to coffee is excessively increased.

Furthermore, the total concentration (ppb) of guaiacol and 4-ethylguaiacol per 1% Brix in the coffee extract of the present invention is not particularly limited as long as the [(a)/(b)] described later is in the predetermined range. The total concentration (ppb) of guaiacol and 4-ethylguaiacol is preferably $1.5 \times 10^{-3}$ to $1.0 \times 10^4$ ppb, more preferably $2.0 \times 10^{-3}$ to $8.0 \times 10^3$ ppb, and further preferably $3.0 \times 10^{-3}$ to $5.0 \times 10^3$ ppb. When (b) the total concentration of guaiacol and 4-ethylguaiacol in the coffee extract of the present invention is too small, what is called "coffee flavor," which comes from bitterness and off-flavors, is reduced. When (b) the total concentration of guaiacol and 4-ethylguaiacol is too high, the off-flavor peculiar to coffee is excessively increased.

In an embodiment the concentration (ppb) of guaiacol per 1% Brix in the coffee extract of the present invention is preferably $7.0 \times 10^{-4}$ to $5.0 \times 10^3$ ppb, more preferably $1.0 \times 10^{-3}$ to $4.0 \times 10^3$ ppb, and further preferably $1.5 \times 10^{-3}$ to $2.5 \times 10^3$ ppb.

In an embodiment the concentration (ppb) of 4-ethylguaiacol per 1% Brix in the coffee extract of the present invention is preferably $7.0 \times 10^{-4}$ to $5.0 \times 10^3$ ppb, more preferably $1.0 \times 10^{-3}$ to $4.0 \times 10^3$ ppb, and more preferably $1.5 \times 10^{-3}$ to $2.5 \times 10^3$ ppb.

1-3. Ratio of (A) Peak Area Ratio of 2,3-butanedione to (B) Sum of Peak Area Ratio of Guaiacol and Peak Area Ratio of 4-ethylguaiacol [(A)/(B)]

The ratio of (A) the peak area ratio of 2,3-butanedione to (B) the sum of the peak area ratio of guaiacol and the peak area ratio of 4-ethylguaiacol [(A)/(B)] in a solution prepared by adjusting the coffee solid concentration (Brix) of the coffee extract of the present invention to 1% is 7.0 or more, preferably 8.0 to 30.0, more preferably 9.0 to 20.0, and further preferably 10.0 to 15.0. When the ratio [(A)/(B)] is too low, the off-flavor peculiar to coffee is excessively increased. When the ratio [(A)/(B)] is too high, the total balance of coffee aroma is lost and unusual sweetness different from that of coffee may be felt.

In an embodiment, the ratio of (a) the concentration (ppb) of 2,3-butanedione to (b) the total concentration (ppb) of guaiacol and 4-ethylguaiacol [(a)/(b)] in the coffee extract of the present invention is preferably 3.1 or more, more preferably 3.4 to 30.0, further preferably 3.6 to 20.0, and particularly preferably 13.8 to 15.0.

1-4. Coffee Solid Concentration

The coffee solid concentration of the coffee extract of the present invention is not particularly limited, and is preferably 20 to 40%, more preferably 25 to 37%, and particularly preferably 30 to 35% in the Brix value.

The Brix value means a value obtained by converting the refractive index which is measured by using a Brix meter or a refractometer at 20° C. into mass/percentage by mass of a sucrose solution based on the ICUMSA (The international Commission for Uniform Methods of Sugar Analysis Ltd.) table. The Brix value indicates the content of soluble solid components in a drink. The unit is "Bx," "%" or "degree."

A low Brix value of a drink means that the content of soluble solid components including carbohydrates is low in the drink.

2. Drinks

An embodiment of the present invention is a drink comprising the coffee extract described above. In the present invention, the coffee extract described above may be directly used as a drink, or may be concentrated or diluted to be used as a drink where necessary. The type of drinks, which is not particularly limited, include coffee, coffee drinks, soft drinks with coffee, soft drinks with coffee (caffeine free) and carbonated drinks with coffee. These drinks are defined in Article 2 of the Fair Competition Code concerning Representations of Coffee Drinks.

One or two or more additives such as an agent for suppressing bitterness, an antioxidant, a perfume, esters, organic acids, organic acid salts, inorganic acids, inorganic acid salts, inorganic salts, pigments, an emulsifier, a preservative, a seasoning, an acidulant and a quality stabilizer may be mixed to the drink of the present invention as necessary. When the drink of the present invention is coffee, a coffee drink, a soft drink with coffee, a soft drink with coffee (caffeine free) and a carbonated drink with coffee, the coffee may be black, or milk or a sweetener such as sugar may be added thereto.

The drink of the present invention may be a drink packed in a container. The type of containers is not particularly limited, and for example, usual packaging containers such as a molded container made mainly of polyethylene terephthalate (what is called a PET bottle), a metal can, a paper container combined with metal foil or plastic film, and a bottle may be used.

Furthermore, the packaged drink may be produced by filling a container such as a metal can with the drink and sterilizing it in sterilization conditions defined in the applicable law (in Japan, the Food Sanitation Act) if heat sterilization is available. For those which are not retort-sterilizable, such as PET bottles and paper containers, a method is applicable, in which drink is sterilized at high temperature for short time using, for example, a plate heat exchanger, in conditions equivalent to those described above and then cooled to a certain temperature and then packed in the container.

3. Method for Producing Coffee Extract

The method for producing the coffee extract of the present invention is not particularly limited as long as the coffee extract contains 2,3-butanedione, guaiacol and 4-ethylguaiacol, and the ratio of (A) the peak area ratio of 2,3-butanedione to (B) the sum of the peak area ratio of guaiacol and the peak area ratio of 4-ethylguaiacol [(A)/(B)] in a solution prepared by adjusting the coffee solid concentration (Brix) of the coffee extract to 1% is in the range described above. In an embodiment, the method for producing the coffee extract of the present invention is not particularly limited as long as the coffee extract contains 2,3-butanedione, guaiacol and 4-ethylguaiacol, and the ratio of (a) the concentration (ppb) of 2,3-butanedione to (b) the total concentration (ppb) of guaiacol and 4-ethylguaiacol [(a)/(b)] in the coffee extract is in the range described above. For example, the coffee extract can be produced by combining continuous multi-tube extraction and evaporative concentration. More specifically, the coffee extract of the present invention can be produced through a) the first extraction step in which water at 70 to 120° C. is supplied to a column packed with roasted and ground coffee beans to prepare a coffee extract, b) the second extraction step in which water at 125 to 150° C. is supplied to the column packed with roasted and ground coffee beans used in the first extraction step to prepare a coffee extract, c) a step for evaporating and concentrating the coffee extract prepared in the second extraction step, and d) a step for mixing the coffee extract prepared in the first extraction step with the evaporated and concentrated coffee extract.

To produce the coffee extract of the present invention, a step for preparing a coffee extract by supplying water at 70 to 120° C., preferably 90 to 110° C., and more preferably 95 to 105° C. to a column packed with roasted and ground coffee beans may be used as the first extraction step. The capacity of the extraction column used in the first extraction step is not particularly limited, and is preferably 10 to 50 L, more preferably 15 to 30 L, and further preferably 20 to 25 L The rate for supplying water per 1 L of the capacity of the column packed with roasted and ground coffee beans in the first extraction step is not particularly limited, and water is supplied thereto at a flow rate of preferably 1.0 to 10.0 kg/h, more preferably 2.0 to 7.0 kg/b, further preferably 3.0 to 5.0 kg/h per 1 L of the capacity of the column. In the present description, supplying water at a flow rate of 1.0 to 10.0 kg/h per 1 L of the capacity of the column means that when the capacity of the column to be used is 5 L, water is supplied to the column at a flow rate of 5.0 to 50.0 k/h.

The extraction ratio of the extract prepared in the first extraction step is not particularly limited, and is preferably 10.0 to 23.0%, more preferably 12.0 to 21.0%, further preferably 14.0 to 20.0%.

It is preferable that in the first extraction step, a plurality of extraction columns packed with roasted and ground coffee beans are serially connected to perform extraction continuously from the viewpoint of preparation of coffee extract rich in coffee-specific aromatic components. The number of extraction columns in the first extraction step is preferably 2 or more, more preferably 2 to 10, and particularly preferably 3 to 6. When a plurality of columns are used, for example, the extraction columns are sequentially replaced to extract a coffee extract continuously in such a manner that water at 70 to 120° C. is supplied to the first extraction column packed with roasted and ground coffee beans to obtain a coffee extract, and then the coffee extract obtained in the first extraction column is supplied to the second extraction column packed with roasted and ground coffee beans.

The capacity of the extraction column used for producing the coffee extract of the present invention is not particularly limited. The packing density of roasted and ground coffee beans to be packed in the extraction column is also not particularly limited, and is preferably 0.20 to 0.50 kg/L (0.20 to 0.50 kg of swollen roasted and ground coffee beans per 1 L of the capacity of the column), more preferably 0.25 to 0.40 kg/L, and further preferably 0.28 to 0.35 kg/L in terms of the amount of swollen roasted and ground coffee beans.

Furthermore, the amount of the coffee extract collected from the extraction column varies depending on the capacity of the column and the amount of roasted and ground coffee beans packed in the column, and thus is not particularly limited, and is preferably 0.05 to 0.50 kg, more preferably 0.08 to 0.30 kg, and particularly preferably 0.10 to 0.20 kg per 1 L of the capacity of the column. As described above, while the present invention includes an embodiment in which extraction columns packed with roasted and ground coffee beans are serially connected to perform extraction continuously, the amount of coffee extract collected per 1 L of the capacity of the column refers to the amount collected per extraction column.

To produce the coffee extract of the present invention, the method may include, after the first extraction step, the second extraction step in which water at a relative high temperature is supplied to a column packed with roasted and ground coffee beans used in the first extraction step to prepare a coffee extract.

In the second extraction step, the column packed with roasted and ground coffee beans used in the first extraction step is used. To produce the coffee extract of the present invention, for example, the extraction temperature in the second extraction step is 125 to 150° C., preferably 125 to 140° C., and more preferably 125 to 135° C.

The capacity of the extraction column used in the second extraction step is not particularly limited, and is preferably 10 to 50 L, more preferably 15 to 30 L, and further preferably 20 to 25 L.

Furthermore, it is preferable to maintain the temperature of the column packed with roasted and ground coffee beans during extraction in the second extraction step. The temperature of the column in the second extraction step is preferably 125 to 150° C., more preferably 125 to 140° C., and further preferably 125 to 135° C.

The rate for supplying water per 1 L of the capacity of the column packed with roasted and ground coffee beans in the second extraction step is not particularly limited, and water is supplied thereto at a flow rate of preferably 1.0 to 10.0 kg/h, more preferably 2.0 to 8.0 kg/h, and further preferably 4.0 to 6.0 kg/h per 1 L of the capacity of the column.

The extraction ratio of the coffee extract prepared in the second extraction step is not particularly limited, and is preferably 4.0 to 14.0%, more preferably 6.0 to 13.0%, further preferably 8.0 to 12.0%

The coffee solid concentration of the coffee extract prepared in the second extraction step is not particularly limited, and is preferably 0.3 to 3.0%, more preferably 0.5 to 2.5%, and further preferably 1.0 to 2.0% in the Brix value.

The number of extraction columns used in the second extraction step is not particularly limited. It is preferable that a plurality of extraction columns packed with roasted and ground coffee beans are serially connected to perform extraction continuously from the viewpoint of preparation of coffee extract having high concentration. The number of extraction columns in the second extraction step is preferably 2 or more, more preferably 2 to 10, and particularly preferably 3 to 6. When a plurality of extraction columns are used, for example, the extraction columns are sequentially replaced to extract a coffee extract continuously in such a manner that water at 125 to 150° C. is supplied to the first extraction column packed with roasted and ground coffee beans to obtain a coffee extract, and then the coffee extract obtained in the first extraction column is supplied to the second extraction column packed with roasted and ground coffee beans.

The capacity of the extraction column used in the second extraction step is not particularly limited. The packing density of roasted and ground coffee beans packed in the extraction column is also not particularly limited, and is preferably 0.2 to 0.5 kg/L, more preferably 0.25 to 0.40 kg/L, and further preferably 0.28 to 0.35 kg/d in terms of the amount of swollen roasted and ground coffee beans.

Furthermore, the amount of the coffee extract collected from the extraction column in the second extraction step is not particularly limited, and is preferably 0.5 to 5.0 kg, more preferably 0.8 to 3.0 kg, and particularly preferably 1.0 to 1.5 kg per 1 L of the capacity of the column.

Furthermore, to produce the coffee extract of the present invention, the method may include, after the second extraction step, a step in which the coffee extract prepared in the second extraction step is evaporated and concentrated.

Since the column packed with roasted and ground coffee beans used in the first extraction step is used in the second extraction step, the efficiency of extraction of coffee extract is not so high even when extraction is performed at high temperature. Furthermore, when coffee is extracted at high temperature, a large amount of off-flavor components is also included in the extract. Then, by evaporative concentration of the coffee extract after the second extraction step, the concentration of the coffee extract can be increased and off-flavor components can be evaporated to reduce off-flavors in the coffee extract.

The temperature of heating in the evaporative concentration step is preferably 100 to 120° C., more preferably 105 to 115° C., and particularly preferably 108 to 112° C.

To produce the coffee extract of the present invention, the method may include a step for mixing the coffee extract prepared in the first extraction step and the evaporated and concentrated coffee extract after the second extraction step. As described above, a coffee extract whose excellent coffee-specific aroma is maintained can be produced in the first extraction step by extracting at low temperature (70 to 120° C.). Furthermore, a coffee extract having high concentration with reduced off-flavors can be obtained by evaporative distillation after the second extraction step. Thus, by mixing the coffee extract prepared in the first extraction step and the coffee extract evaporated and concentrated after the second extraction step, a coffee extract with increased coffee-specific aroma and reduced off-flavors can be produced.

The ratio of mixing the coffee extract prepared in the first extraction step and the coffee extract evaporated and concentrated after the second extraction step so as to produce the coffee extract of the present invention is not particularly limited. The coffee extract prepared in the first extraction step and the coffee extract evaporated and concentrated after the second extraction step are mixed so that the coffee extract after mixing has the desired Brix value. In the production of the coffee extract of the present invention, the coffee solid concentration of the coffee extract prepared by mixing the coffee extract prepared in the first extraction step and the coffee extract evaporated and concentrated after the second extraction step is preferably 20 to 40%, more preferably 25 to 37%, and particularly preferably 30 to 35% in the Brix value.

EXAMPLES

The present invention will be described in more detail with reference to Examples, but the present invention is not limited thereto.

(1) Production of Roasted and Around Coffee Beans

Raw coffee beans (made in Brazil, *Arabica* variety) were roasted by a coffee roaster (made by Probat) so that the L value was 20. Then, the roasted coffee beans were ground by a roller mill (made by GEA) to give roasted and ground coffee beans.

(2) Production of Coffee Extract (i) First Extraction Step

The roasted and ground coffee beans produced in the above (1) were swollen with water (20% by weight) and the beans were packed in an extraction column (made by GEA, capacity 23 L) so that the weight of the beans was 7.0 kg/column. Then, water at 100° C. was supplied to the column at an extraction temperature of 100° C. and a flow rate of 80 kg/hour, and extraction was performed so that the amount of liquid collected was 3 kg. Next, roasted and ground coffee beans were packed in the second column so that the weight of beans after swelling was 7.0 kg/column, and extraction was performed with the two columns connected so that the amount of liquid collected was also 3 kg. Furthermore, roasted and ground coffee beans were packed in the third column so that the weight of beans after swelling was 7.0 kg/column, and extraction was performed with the three columns connected so that the amount of liquid collected was also 3 kg. The beans in the first column after three times of extraction were sent to the step for collecting the second extract. Roasted and ground coffee beans were freshly packed in the fourth column so that the weight of beans after swelling was 7.0 kg/column, and extraction was performed with the three columns connected so that the amount of liquid collected was also 3 kg. These extraction steps were repeated (batches 1 to 18), and the extracts of batches 10 to 18 which provided stable extraction ratios and Brix values were mixed to give a coffee extract after the first extraction step. The results of measurements of the respective batches are shown in Table 1. The final amount of the coffee extract after the first extraction step was 29.82 kg, Brix was 29.21% and the average extraction ratio was 17.92%.

TABLE 1

| Batch | First extraction step | | | Second extraction step | | | Total |
| --- | --- | --- | --- | --- | --- | --- | --- |
| | Amount of liquid [kg] | Brix[%] | Extraction ratio [%] | Amount of liquid [kg] | Brix[%] | Extraction ratio [%] | Extraction ratio [%] |
| 1 | 3.11 | 0.13 | 0.07 | | | 0 | 0.07 |
| 2 | 3.22 | 5.03 | 3.00 | | | 0 | 3.00 |
| 3 | 3.23 | 9.36 | 5.60 | | | 0 | 5.60 |
| 4 | 3.27 | 13.41 | 8.12 | 25.78 | 0.30 | 1.43 | 9.55 |
| 5 | 3.26 | 15.38 | 9.28 | 26.01 | 0.58 | 2.78 | 12.07 |
| 6 | 3.32 | 18.81 | 11.56 | 27.55 | 1.08 | 5.51 | 17.07 |
| 7 | 3.3 | 20.31 | 12.41 | 27.31 | 1.31 | 6.63 | 19.04 |
| 8 | 3.31 | 22.14 | 13.57 | 26.88 | 1.58 | 7.86 | 21.44 |
| 9 | 3.31 | 23.08 | 14.16 | 27.79 | 1.72 | 8.85 | 23.00 |
| 10 | 3.34 | 25.12 | 15.54 | 26.62 | 1.85 | 9.12 | 24.66 |
| 11 | 3.36 | 26.43 | 16.45 | 25.70 | 1.93 | 9.21 | 25.65 |
| 12 | 3.17 | 28.99 | 17.02 | 27.36 | 2.01 | 10.18 | 27.20 |
| 13 | 3.43 | 29.78 | 18.92 | 26.90 | 1.90 | 9.46 | 28.38 |
| 14 | 3.26 | 30.10 | 18.17 | 28.26 | 1.85 | 9.68 | 27.86 |

TABLE 1-continued

| | First extraction step | | | Second extraction step | | | Total |
|---|---|---|---|---|---|---|---|
| Batch | Amount of liquid [kg] | Brix[%] | Extraction ratio [%] | Amount of liquid [kg] | Brix[%] | Extraction ratio [%] | Extraction ratio [%] |
| 15 | 3.44 | 30.07 | 19.16 | 28.08 | 1.70 | 8.84 | 28.00 |
| 16 | 3.27 | 31.42 | 19.03 | 27.95 | 1.66 | 8.59 | 27.62 |
| 17 | 3.3  | 30.05 | 18.36 | 28.15 | 1.66 | 8.65 | 27.02 |
| 18 | 3.25 | 30.94 | 18.62 | 28.66 | 1.64 | 8.70 | 27.33 |

(ii) Second Extraction Step

At most the 4 columns packed with roasted and ground coffee beans used in the first extraction step of the above (i) were serially connected. Then water at 130° C. was supplied to the columns so that the extraction temperature was 130° C. and the flow rate was 120 kg/hour. Extraction was performed so that the amount of liquid collected was 25 kg and the target extraction ratio was 10%. The beans were discharged from the column when 4 times of extraction was completed, and new beans were packed in the column and freshly used in the first extraction step. These extraction steps were repeated (batches 4 to 18; no second extraction step in batches 1 to 3 because the first extraction step was not completed), and the extracts of batches 10 to 18 which provided stable extraction ratios and Brix values were mixed to give a coffee extract after the second extraction step. The results of measurements of the respective batches are shown in Table 1. The final amount of the coffee extract after the second extraction step was 247.74 kg, Brix was 1.80% and the average extraction ratio was 9.16%.

(iii) Step of Evaporative Distillation

About 250 kg of the coffee extract after the second extraction step obtained in the above (ii) was concentrated at a heating temperature of 110° C. and an evaporation temperature of 50° C. so that the coffee solid concentration in the extract was 50%. The amount after evaporative distillation of the coffee extract after the second extraction step obtained in the above (ii) was 5.62 kg and Brix was 55.18%.

(iv) Preparation of Coffee Extract Sample

<Inventive Product>

About 1.0 kg of the coffee extract prepared in the first extraction step of the above (i) and 0.297 kg of the coffee extract prepared by evaporative distillation of the coffee extract prepared in the second extraction step of the above (iii) were mixed to prepare an inventive product. The amount of the inventive product was 12.9 kg and Brix was 34.0%.

<Existing Products 1 to 5>

5 coffee extracts produced by another company were used as existing products 1 to 5.

(3) Analysis of Coffee Extract Sample

The coffee solid concentration (Brix) of the inventive coffee extracts and the existing coffee extracts 1 to 5 was adjusted to 1%, and the peak area ratio of 2,3-butanedione, guaiacol and 4-ethylguaiacol in the diluted coffee extracts was determined by gas chromatography-mass spectrometry using 10 ppb of borneol as an internal standard material. The conditions of gas chromatography-mass spectrometry are as follows.

GC main apparatus: Agilent Technologies 7890A
MS detector: Agilent Technologies 5975C inert XL MSD with Triple-Axis Detector
Apparatus for pretreatment: MultiPurpose Sampler MPS for GC
Conditions for injecting sample: DHS (dynamic head space) method
Temperature of sample 80° C.
Pressure 160 kPa
Septum purge flow rate 3 mL/min
Splitless mode
Column: HP-INNOWAX (length: 60 m, diameter: 0.250 mm, thickness: 0.25 µm)
Flow rate 1.5 mL/min
Pressure 160 kPa
Oven: 40° C.→240° C. (7.5° C./min)
Post run: 10 minutes The peak area ratio of 23-butanedione, guaiacol and 4-ethylguaiacol in the inventive product and the existing products 1 to 5 is shown in Table 2. The ratio of the peak area ratio of 2,3-butanedione to the sum of the peak area ratio of guaiacol and the peak area ratio of 4-ethylguaiacol, (A)/(B), is also shown in Table 2. The concentration of 2,3-butanedione, guaiacol and 4-ethylguaiacol per 1% of the coffee solid concentration (Brix) in the inventive coffee extract and the existing coffee extracts 1 to 5 is shown in Table 3. The ratio of (a) the concentration (ppb) of 2,3-butanedione to (b) the total concentration (ppb) of guaiacol and 4-ethylguaiacol, (a)/(b), is also shown in Table 3. Since the inventive product has a coffee solid concentration (Brix) of 34.0% as described above, the concentration of 2,3-butanedione, guaiacol, and 4-ethylguaiacol in the inventive product is 0.55 ppb, 0.05 ppb and 0.09 ppb, respectively.

TABLE 2

| | 2,3-Butanedione (A) (Peak area ratio) | Guaiacol (Peak area ratio) | 4-Ethylguaiacol (Peak area ratio) | Guaicol + 4-Ethylguaiacol (B) (Peak area ratio) | Ratio (A/B) |
|---|---|---|---|---|---|
| Existing product 1 | 0.36 | 0.54 | 0.49 | 1.04 | 0.35 |
| Existing product 2 | 2.15 | 0.23 | 0.13 | 0.36 | 5.96 |
| Existing product 3 | 0.72 | 0.40 | 0.25 | 0.65 | 1.11 |
| Existing product 4 | 1.17 | 0.27 | 0.20 | 0.46 | 2.52 |

TABLE 2-continued

|  | 2,3-Butanedione (A) (Peak area ratio) | Guaiacol (Peak area ratio) | 4-Ethylguaiacol (Peak area ratio) | Guaiacol + 4-Ethylguaiacol (B) (Peak area ratio) | Ratio (A/B) |
|---|---|---|---|---|---|
| Existing product 5 | 0.82 | 0.07 | 0.05 | 0.12 | 6.86 |
| Inventive product | 1.04 | 0.08 | 0.04 | 0.12 | 8.45 |

TABLE 3

|  | 2,3-Butanedione (a) (ppb) | Guaiacol (ppb) | 4-Ethylguaiacol (ppb) | Guaiacol + 4-Ethylguaiacol (b) (ppb) | Ratio (a/b) |
|---|---|---|---|---|---|
| Existing product 1 | 0.006 | 0.011 | 0.028 | 0.039 | 0.14 |
| Existing product 2 | 0.033 | 0.005 | 0.007 | 0.012 | 2.82 |
| Existing product 3 | 0.011 | 0.008 | 0.014 | 0.022 | 0.51 |
| Existing product 4 | 0.018 | 0.005 | 0.011 | 0.016 | 1.10 |
| Existing product 5 | 0.013 | 0.001 | 0.003 | 0.004 | 3.01 |
| Inventive product | 0.010 | 0.002 | 0.003 | 0.004 | 3.95 |

(4) Sensory Evaluation Test of Coffee Extract

Next, the inventive product and the existing products 1 to 5 produced in the above (2) were diluted with hot water, respectively so that the Brix was 1% to give a sample drink for sensory evaluation test. Then sensory evaluation of the sample drinks were performed by three expert panelists. The results of the sensory evaluation of the respective sample drinks are shown in Table 4.

TABLE 4

| Existing product 1 | Much off-flavor and harsh taste, little aroma initially felt |
|---|---|
| Existing product 2 | Much aroma but rough, off-flavor like taste |
| Existing product 3 | Much off-flavor and harsh taste, little aroma initially felt. |
| Existing product 4 | Aroma slightly increased but some off-flavors remaining |
| Existing product 5 | Much aroma but rough, off-flavor like taste |
| Inventive product | Sufficient initial aroma and remarkably clean |

As shown in Tables 2 to 4, panelists commented that the "inventive product" in which the ratio of (A) the peak area ratio of 2,3-butanedione to (B) the sum of the peak area ratio of guaiacol and the peak area ratio of 4-ethylguaiacol [(A)/(B)] in the coffee extraction is in the predetermined range had sufficient initial aroma and were remarkably clean. This shows that the coffee-specific aroma has been increased and off-flavors have been reduced. By contrast, when [(A)/(B)] is below the range according to the present invention, off-flavors and bitterness are felt. The same applies to the "inventive product" in which the ratio of (a) the concentration (ppb) of 2,3-butanedione to (b) the total concentration (ppb) of guaiacol and 4-ethylguaiacol [(a)/(b)] in the coffee extraction is in the predetermined range. As described above, the results show that a coffee extract with increased coffee-specific aroma and reduced off-flavors can be provided by setting the peak area ratio [(A)/(B)] and the ratio of concentration [(a)/(b)] to the predetermined range.

INDUSTRIAL APPLICABILITY

The present invention provides a coffee extract with increased coffee-specific aroma and reduced off-flavors, and thus the coffee extract is highly industrially applicable.

The invention claimed is:

1. A coffee extract comprising 2,3-butanedione, guaiacol and 4-ethylguaiacol, wherein the ratio of (a) the concentration (ppb) of 2,3-butanedione to (b) the total concentration (ppb) of guaiacol and 4-ethylguaiacol [(a)/(b)] in the coffee extract is 3.1 or more.

2. The coffee extract according to claim 1, wherein the [(a)/(b)] is 3.4 to 30.0.

3. The coffee extract according to claim 1, wherein the coffee extract has a coffee solid concentration (Brix) of 20 to 40%.

4. A drink comprising the coffee extract according to claim 1.

* * * * *